US010671113B2

(12) United States Patent
Lovett

(10) Patent No.: US 10,671,113 B2
(45) Date of Patent: Jun. 2, 2020

(54) TECHNOLOGIES FOR SYNCHRONIZED SAMPLING OF COUNTERS BASED ON A GLOBAL CLOCK

(71) Applicant: INTEL CORPORATION, Santa Clara, CA (US)

(72) Inventor: Thomas D. Lovett, Portland, OR (US)

(73) Assignee: Intel Corporation, Santa Clara, CA (US)

(*) Notice: Subject to any disclaimer, the term of this patent is extended or adjusted under 35 U.S.C. 154(b) by 43 days.

(21) Appl. No.: 15/531,193

(22) PCT Filed: Dec. 27, 2014

(86) PCT No.: PCT/US2014/072459
§ 371 (c)(1),
(2) Date: May 26, 2017

(87) PCT Pub. No.: WO2016/105444
PCT Pub. Date: Jun. 30, 2016

(65) Prior Publication Data
US 2017/0351294 A1     Dec. 7, 2017

(51) Int. Cl.
| | |
|---|---|
| G06F 1/12 | (2006.01) |
| G06F 13/42 | (2006.01) |
| H04L 5/00 | (2006.01) |
| G06F 1/10 | (2006.01) |
| G06F 11/34 | (2006.01) |

(52) U.S. Cl.
CPC ............... *G06F 1/10* (2013.01); *G06F 1/12* (2013.01); *G06F 11/3476* (2013.01); *G06F 11/3495* (2013.01); *G06F 2201/88* (2013.01)

(58) Field of Classification Search
CPC ........................................................ G06F 1/10
See application file for complete search history.

(56) References Cited

U.S. PATENT DOCUMENTS

| | | | |
|---|---|---|---|
| 5,949,971 A | 9/1999 | Levine et al. | |
| 6,751,573 B1 | 6/2004 | Burch | |
| 6,789,046 B1 | 9/2004 | Murstein et al. | |
| 6,789,182 B1 | 9/2004 | Brothers et al. | |
| 7,453,910 B1 | 11/2008 | Biberstein et al. | |
| 7,509,539 B1 | 3/2009 | Denefleh et al. | |
| 9,396,146 B1* | 7/2016 | Sutardja | G06F 13/3625 |
| 9,804,231 B2* | 10/2017 | Eckert | G01R 31/40 |
| 2008/0100360 A1* | 5/2008 | Ngo | G01R 31/31727 327/172 |
| 2008/0222382 A1 | 9/2008 | Snyder | |

(Continued)

OTHER PUBLICATIONS

International search report for PCT application No. PCT/US2014/072459, dated Jul. 16, 2015 (3 pages).

(Continued)

*Primary Examiner* — Mohammed H Rehman
(74) *Attorney, Agent, or Firm* — Barnes & Thornburg LLP

(57) ABSTRACT

Technologies for synchronized sampling of counters include a computing device to determine a global clock to which the computing device and a plurality of other computing devices are to be synchronized. The computing device receives a request to sample a counter of the computing device from an administration server and records a state of the counter based on the global clock in response to receiving the request.

23 Claims, 5 Drawing Sheets

(56) References Cited

U.S. PATENT DOCUMENTS

| | | | | |
|---|---|---|---|---|
| 2013/0159780 A1* | 6/2013 | Bedwell | ............. | G06F 11/3466 |
| | | | | 714/45 |
| 2016/0352826 A1* | 12/2016 | Zhou | ................... | H04L 65/4092 |
| 2017/0351294 A1* | 12/2017 | Lovett | ...................... | G06F 1/12 |
| 2018/0284878 A1* | 10/2018 | Artieri | .................... | G06F 1/324 |

OTHER PUBLICATIONS

Written opinion for PCT application No. PCT/US2014/072459, dated Jul. 16, 2015 (7 pages).
Extended European Search Report dated Jun. 8, 2018 for European Patent Application No. 14909270.2-1221, 8 pages.
"IEEE Standard for a Precision Clock Synchronization Protocol for Networked Measurement and Control Systems; IEEE Std 1588-2008 (Revision of IEEE Std 1588-2002) Anonymous", IEEE Standard; [IEEE Standard], IEEE, Piscataway, NJ, USA, Jul. 24, 2008 (Jul. 24, 2008), pp. c1-c269.
Chinese Office action in Chinese patent application No. 201480083821.4, dated Sep. 27, 2019, including machine translation (22 pages).
European Office action in European patent application No. 14909270.2, dated Jan. 8, 2019 (7 pages).

* cited by examiner

TECHNOLOGIES FOR SYNCHRONIZED SAMPLING OF COUNTERS BASED ON A GLOBAL CLOCK

CROSS REFERENCE TO RELATED APPLICATIONS

The present application claims priority to and is a national stage entry under 35 USC § 371(b) of International Application No. PCT/US2014/072459, which was filed Dec. 27, 2014, entitled "TECHNOLOGIES FOR SYNCHRONIZED SAMPLING OF COUNTERS BASED ON A GLOBAL CLOCK."

BACKGROUND

Performance counters are often used in computing systems in order to provide insight into system behavior. For example, system performance engineers may monitor and analyze data collected by performance counters in order to tune system performance. In computing systems that span networks, it is difficult to correlate performance counters from different devices. In particular, although the computing devices of the system may be periodically requested to sample their corresponding performance counters, those samples generally represent behavior that occurred during different time periods. As such, performance counter analysis has been traditionally limited to the analysis of counters that are tracked over many samples, over a relatively large period (e.g., 100 seconds), and/or averaged. Although doing so may reduce the errors associated with the skewed start and sampling times of the various computing devices, fleeting events are often entirely lost or suppressed in the data and the corresponding analysis.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
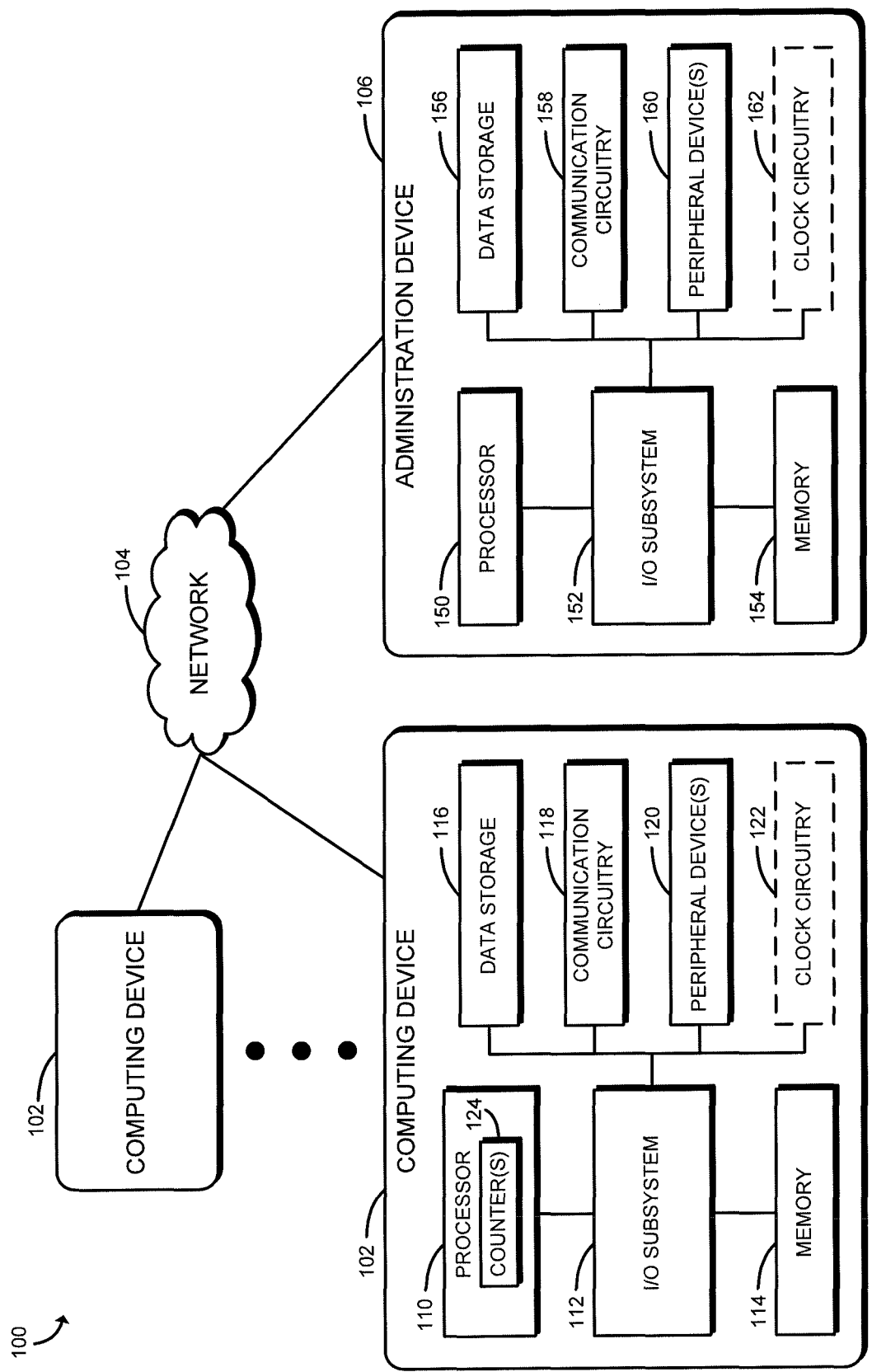
FIG. 1 is a simplified block diagram of at least one embodiment of a system for synchronized sampling of counters based on a global clock.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for synchronized sampling of counters (e.g., performance counters) based on a global clock illustratively includes one or more computing devices 102, a network 104, and an administration device 106. As described herein, the system 100 may include any number of computing devices 102. Although only one network 104 and one administration device 106 are illustratively shown in FIG. 1, the system 100 may include any number of networks 104 and/or administration devices 106 in other embodiments. Further, in some embodiments, the administration device 106 may be embodied as one of the computing devices 102.

As described in detail below, in the illustrative embodiment, each of the computing devices 102 and, in some embodiments, the administration device 106 include a local clock against which various events are tracked, sampled, and/or planned. The computing devices 102 and/or the administration device 106 may communicate with one another and determine which of the local clocks to utilize as a global clock. In the illustrative embodiment, each of the computing devices 102 adjusts its local clock to coincide with the determined/selected global clock and/or otherwise ensures that counters of the corresponding computing device 102 are sampled based on the global clock. The administration device 106 may instruct the computing devices 102 when to sample the corresponding counters (e.g., performance counters) based on the global clock. For example, the computing devices 102 may synchronously sample their counters based on a starting global time and length or end time (e.g., determine the change in the state of the counters between the starting global time and end time). In other embodiments, the computing devices 102 may synchronously sample the counters periodically based on a starting global time and an interval.

Each of the illustrative computing devices 102 may be embodied as any type of computing device capable of performing the functions described herein. For example, each of the computing devices 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative computing device 102 includes a processor 110, an input/output ("I/O") subsystem 112, a memory 114, a data storage 116, a communication circuitry 118, and one or more peripheral devices 120. Additionally, in some embodiments, the computing device 102 may also include a clock circuitry 122. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments. Although components are illustrative shown and described in reference to only one of the computing devices 102, it should be appreciated that each of the computing devices 102 may include similar components.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

As shown in FIG. 1, the processor 110 includes one or more counters 124. In the illustrative embodiment, the counters 124 are embodied as performance counters configured to record data associated with the performance of the computing device 102; however, in other embodiments, the counters 124 may be embodied as any other counters suitable for performing the functions described herein. As described herein, each of the counters 124 may change its state (e.g., the data associated therewith) over time based on, for example, the occurrence of events corresponding with the particular counter 124. As such, in some embodiments, the computing device 102 may determine the state of a particular counter 124 at a starting point and the state of that counter 124 after some period of time (e.g., at an end point) and utilize that information to determine a change in the state of the counter 124 that occurred over that period of time. Further, it should be appreciated that the counters 124 may be sampled once (e.g., with a "one-shot" sample) or periodically depending on the particular implementation or purpose of the sampling (e.g., debugging, event logging, etc.). In some embodiments, the counters 124 include a common control register that controls when the counters 124 are reset and when they start/stop, which may be modified by the computing device 102 (e.g., in response to a request from the administration device 106). In other embodiments, the counters 124 continuously "run free" (e.g., for periodic event logging). Depending on the particular embodiment, the counters 124 may be sampled or recorded to a register (e.g., a shadow register), the memory 114, and/or the data storage 116. Further, although the counters 124 are illustratively shown as forming a portion of or otherwise being associated with the processor 110, it should be appreciated that, additionally or alternatively, the counters 124 may form a portion of and/or be associated with another component of the computing device 102 (e.g., the communication circuitry 118).

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 102 useful for performing the functions described herein. For example, the computing device 102 may record the sampled state/data of the counters 124 as described herein.

The communication circuitry 118 may be embodied as any communication circuit, device, or collection thereof, capable of enabling communications between the computing device 102 and other remote devices over a network. The communication circuitry 118 may be configured to use any one or more communication technologies (e.g., wireless or wired communications) and associated protocols (e.g., Ethernet, Bluetooth®, WiFi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 102.

The clock circuitry 122 may be embodied as any hardware component(s) or circuitry capable of maintaining a local clock of the computing device 102. As described herein, in the illustrative embodiment, the clock circuitry 122 adjusts the local clock of the computing device 102 to coincide with the global clock selected, negotiated, and/or otherwise determined by the computing device(s) 102. In other embodiments, the clock circuitry 122 may otherwise ensure that the counters 124 are sampled based on the global clock. For example, in some embodiments, the clock circuitry 122 may maintain a clock separate from the local clock, which may be adjusted to coincide with the global clock. Although the clock circuitry 122 is illustratively shown as an independent component, it should be appreciated that, in some embodiments, the clock circuitry 122 may form a portion of another component of the computing device 102 (e.g., the processor 110).

The network 104 may be embodied as any type of communication network capable of facilitating communication between the computing device 102 and remote devices (e.g., the administration device 106 and/or other computing devices 102). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The administration device 106 may be embodied as any computing device capable of performing the functions described herein. For example, the administration device 106 may be embodied as a cellular phone, smartphone, wearable computing device, personal digital assistant, mobile Internet device, laptop computer, tablet computer, notebook, netbook, Ultrabook™, desktop computer, server, router, switch, Hybrid device, and/or any other computing/communication device.

As shown in FIG. 1, the illustrative administration device 106 includes a processor 150, an input/output ("I/O") subsystem 152, a memory 154, a data storage 156, a communication circuitry 158, and one or more peripheral devices 160. Additionally, in some embodiments, the administration device 106 may also include a clock circuitry 162. Of course, the administration device 106 may include other or additional components, such as counters and/or components commonly found in a typical computing device (e.g., various input/output devices and/or other components), in other embodiments. Additionally, in some embodiments, one or more of the illustrative components may be incorporated in, or otherwise form a portion of, another component. In some embodiments, the components of the administration device 106 are similar to the corresponding components of the computing device 102 described above. As such, the description of those components is not repeated herein for clarity of the description.

Figure 2:
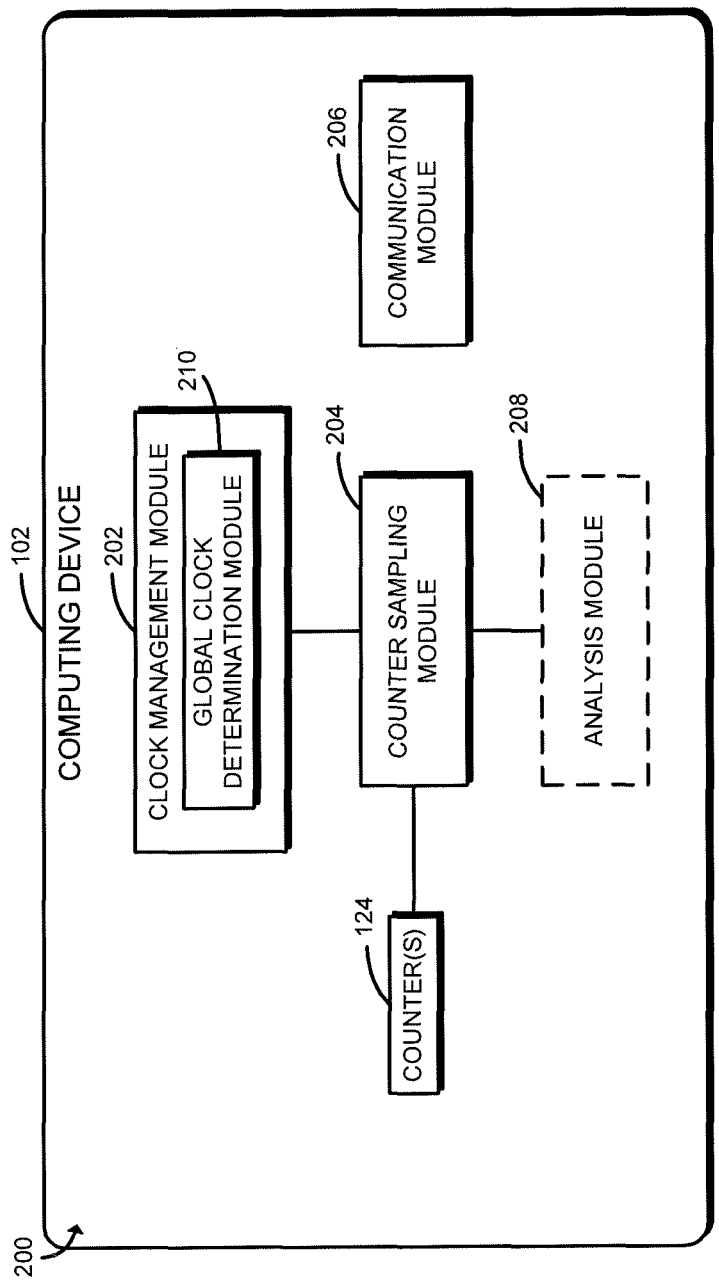
FIG. 2 is a simplified block diagram of at least one embodiment of an environment of the computing device of FIG. 1.

Referring now to FIG. 2, in use, the computing device 102 establishes an environment 200 for synchronized sampling of counters. The illustrative environment 200 of the computing device 102 includes a clock management module 202, a counter sampling module 204, and a communication module 206 and, in some embodiments, also includes an analysis module 208. Additionally, the clock management module 202 includes a global clock determination module 210. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 102. As such, in some embodiments, one or more of the modules of the environment 200 may be embodied as a circuit or collection of electrical devices (e.g., a clock management circuit, a counter sampling circuit, a communication circuit, an analysis circuit, and/or a global clock determination circuit). Additionally, in some embodiments, one or more of the illustrative modules may form a portion of another module and/or one or more of the illustrative modules may be embodied as a standalone or independent module.

The clock management module 202 is configured to handle the management of the local clock and/or other clocks of the computing device 102. For example, in the illustrative embodiment, the clock management module 202 determines the global clock to which the computing devices 102 are to be synchronized and ensures that the counters 124 are sampled based on the global clock. To do so, the clock management module 202 may adjust the local clock of the computing device 102 to coincide with the global clock and/or account for latency associated with receiving the global clock signal that identifies the global clock.

As indicated above, the clock management module 202 includes a global clock determination module 210, which determines the global clock of the system 100. It should be appreciated that the global clock determination module 210 may determine the global clock to which to synchronize sampling of the counters 124 using any suitable techniques, algorithms, and/or mechanisms. In some embodiments, the global clock determination module 210 of the computing device 102 communicates with the other computing devices 102 and/or the administration device 106 (e.g., by virtue of the communication module 206) to select, negotiate, and/or otherwise determine the global clock (e.g., selecting a local clock of one of the computing devices 102 to serve as the global clock). For example, in some embodiments, the global clock determination module 210 determines the global clock according to IEEE Standard 1588 ("IEEE Standard for a Precision Clock Synchronization Protocol for Network Measurement and Control Systems"). In other embodiments, the computing device 102 receives a clock signal from the administration device 106 (e.g., the local clock of the administration device 106) in which to utilize as the global clock. It should be appreciated that, in some embodiments, the global clock determination module 210 may periodically update the global clock signal, for example, to account for and/or remedy clock drift.

The counter sampling module 204 is configured to receive requests from the administration device 106 to sample the counters 124 and to record the states of the counters 124 based on the global clock in response to receiving those requests. For example, the administration device 106 may request the computing device 102 (and other computing devices 102) to synchronously sample the counters 124 based on a starting global time, a length or ending global time (e.g., for one-time sampling), an interval (e.g., for periodic sampling), and/or other parameters. As such, the counter sampling module 204 records the state/data of the counters 124 based on the corresponding criteria. In the illustrative embodiment, the counter sampling module 204 records the state of the counters 124 at the same point in time at which each of the other computing devices 102 is recording the state of the counters of those computing devices 102 (i.e., synchronously).

The communication module 206 handles the communication between the computing device 102 and remote devices (e.g., the administration device 106 and/or the other computing devices 102) through the network 104. For example, as described herein, the communication module 206 transmits the recorded state of the counters 124 to the administration device 106 (e.g., for analysis).

As indicated above, in some embodiments, the computing device 102 includes an analysis module 208. In such embodiments, the analysis module 208 may analyze the recorded counter data to determine, for example, various characteristics associated with the performance of the computing device 102 (e.g., corresponding with the particular purpose of a counter 124). In other words, the analysis module 208 may determine various intra-device characteristics of the computing device 102.

Figure 3:
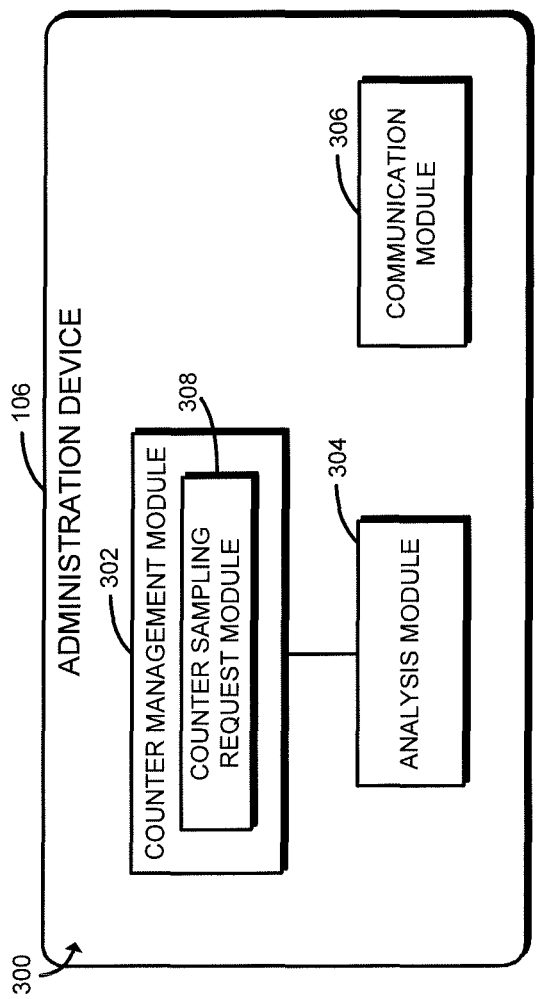
FIG. 3 is a simplified block diagram of at least one embodiment of an environment of the administration device of FIG. 1.

Referring now to FIG. 3, in use, the administration device 106 establishes an environment 300 for analyzing synchronously collected counter data of a plurality of computing devices 102. The illustrative environment 300 of the administration device 106 includes a counter management module 302, an analysis module 304, and a communication module 306. Additionally, in some embodiments, the counter management module 302 includes a counter sampling request module 308. The various modules of the environment 300 may be embodied as hardware, software, firmware, or a combination thereof. For example, the various modules, logic, and other components of the environment 300 may form a portion of, or otherwise be established by, the processor 150 or other hardware components of the administration device 106. As such, in some embodiments, one or more of the modules of the environment 300 may be embodied as a circuit or collection of electrical devices (e.g., counter management circuit, an analysis circuit, a communication circuit, and/or a counter sampling request circuit). Additionally, in some embodiments, one or more of the illustrative modules may form a portion of another module and/or one or more of the illustrative modules may be embodied as a standalone or independent module.

The counter management module 302 is configured to handle requests for counter state/data from the computing devices 102. In particular, the counter sampling request module 308 of the counter management module 302 generates requests for the computing devices 102 to sample the corresponding counters of those computing devices 102 based on the global clock. In doing so, the counter sampling request module 308 may determine a starting global time and/or an ending global time (or duration after the starting global time) at which the computing devices 102 are to record the counters 124. Further, in some embodiments, the counter sampling request module 308 may request the computing devices 102 to periodically sample the counters 124.

The analysis module 304 analyzes the counter state data received from the computing devices 102. It should be appreciated that because the counters are synchronously sampled across the various computing devices 102 in the computing system, the administration device 106 may analyze and/or determine the occurrence of even short-lived events. As such, short duration events are not lost in the analysis. In other words, the analysis module 304 may determine various characteristics of the system 100 based on an analysis of the counter state data received from the computing devices 102 at even a fine granularity.

The communication module 306 handles the communication between the administration device 106 and remote devices (e.g., the computing devices 102) through the network 104. For example, as described herein, the communication module 306 transmits the sampling requests to the computing devices 102 and receives the counter data recorded by the computing devices 102.

Figure 4:
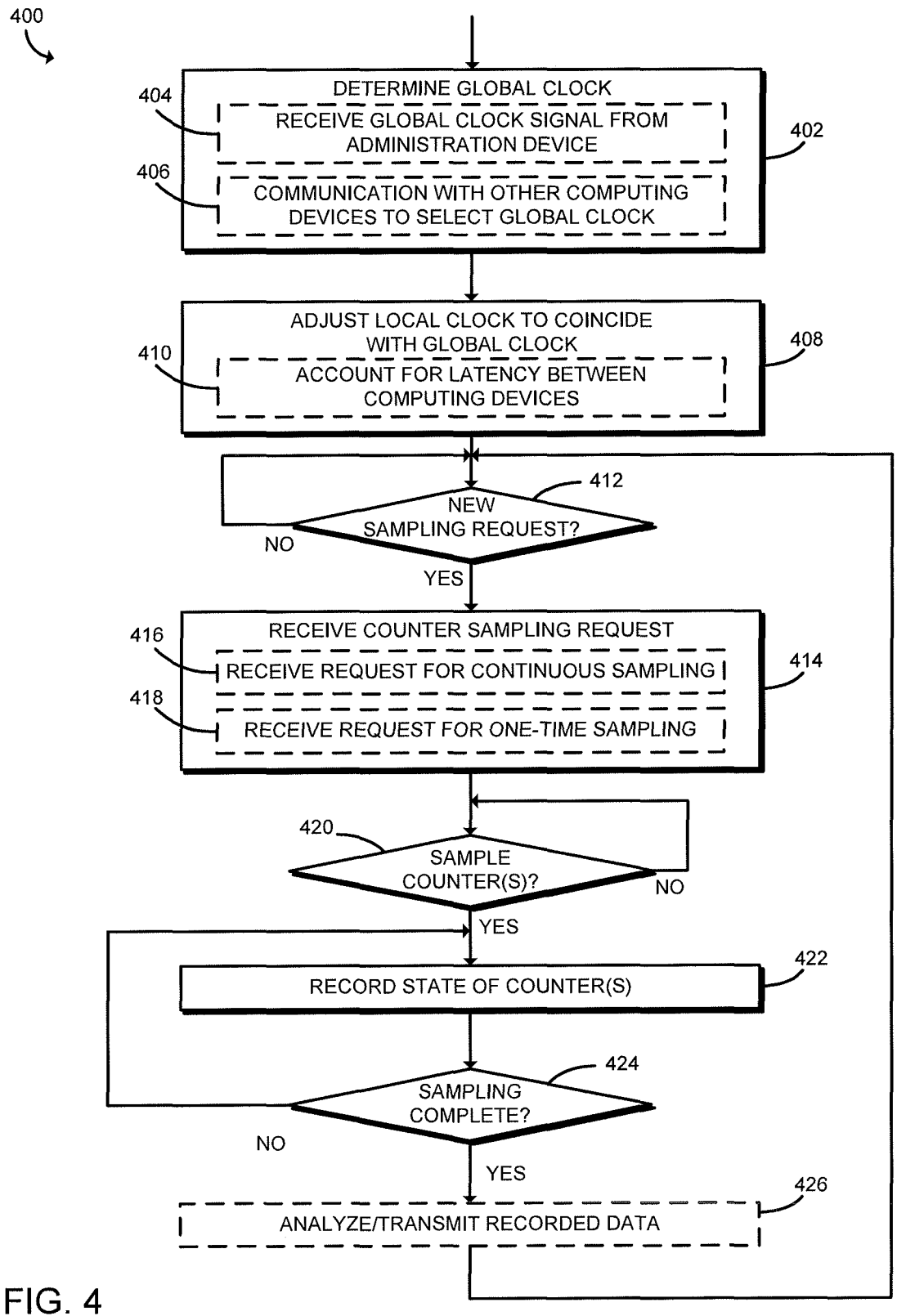
FIG. 4 is a simplified flow diagram of at least one embodiment of a method for synchronized sampling of counters that may be executed by the computing device of FIG. 1.

Referring now to FIG. 4, in use, each of the computing devices 102 may execute a method 400 for synchronized sampling of counters. The illustrative method 400 begins with block 402 in which the computing device 102 determines the global clock to which to synchronize counter sampling. In block 404, the computing device 102 may receive a global clock signal from the administration device 106 to use as the global clock. For example, the local clock of the administration device 106 may be selected as the global clock. In other embodiments, in block 406, the computing device 102 may communicate with the other computing devices 102 to select a global clock. For example, the computing devices 102 may communicate with one another to select the most accurate, most reliable, or otherwise "best" local clock of the computing devices 102 to serve as the global clock. In particular, in some embodiments, the computing device 102 may determine/select the global clock by virtue of IEEE Standard 1588 or another suitable clock selection protocol.

In block 408, the computing device 102 adjusts the local clock of the computing device 102 (e.g., via the clock circuitry 122) to coincide with the determined global clock to which the computing device 102 and other computing devices 102 are to be synchronized. In doing so, in block 410, the computing device 102 may account for latency between the computing device 102 and other computing devices 102 and/or the administration device 106 that may affect the accuracy of the global clock signal. For example, the global clock signal may have some delay between transmission and receipt by the computing device 102; such delay may be remedied upon receipt to ensure that the global clock used by the computing device 102 is that same as that used by the other computing devices 102. As described above, in some embodiments, the computing device 102 may not adjust the local clock to the global clock but instead use a separate, independent clock to track the global clock for sampling purposes.

As discussed herein, the administration device 106 may transmit a request to the computing devices 102 to sample one or more of the counters 124 of those computing devices 102. As such, in block 412, the computing device 102 determines whether a new sampling request has been received from the administration device 106. If so, in block 414, the computing device 102 receives the counter sampling request from the administration device 106. As discussed above, depending on the particular embodiment, the computing device 102 may receive a request for continuous sampling in block 416 or a request for a one-time sampling in block 418. For example, the administration device 106 may request a one-time sampling of the counters 124 for debug purposes and/or other suitable circumstances and/or continuous or periodic sampling of the counters 124 to create a data log of the states/data of the counters 124 for subsequent analysis by the administration device 106. As indicated above, the particular sampling request may include a starting/ending global time, a length, an interval, and/or other parameters associated with the sampling.

In block 420, the computing device 102 determines whether to sample the counters 124 of the computing device 102 based on the global clock. For example, as indicated above, the sampling request may indicate a particular starting global time at which the sampling should begin. As such, the computing device 102 may wait until that time to begin sampling (e.g., for either continuous/periodic sampling or one-time sampling). If the computing device 102 determines the corresponding sampling conditions have been met to end the sampling period, the computing device 102 records the state of the counters 124 in block 422. For example, the computing device 102 may record the state of the counters 124 at the point in time at which the corresponding periodic sampling interval or one-time sampling period has expired. Depending on the particular request, the computing device 102 may record the state of each of the counters 124 or only a subset of the counters 124. Further, as described above, in embodiments in which the computing device 102 is to determine the change in the counter data over a period of time, the computing device 102 may sample a particular counter 124 at the designated global start time and again at the corresponding global end time and determine the difference.

In block 424, the computing device 102 determines whether the sampling is complete. For example, for a one-time sampling, the computing device 102 may determine whether the global end time has been reached and the end time sample has been taken (i.e., in block 422). As discussed above, in some embodiments, the computing device 102 may be configured to continuously or periodically sample the counters 124 in which case the computing device 102 again records the state of the counters 124 in block 422 (e.g., after the corresponding sample interval has passed). If the computing device 102 is done sampling (e.g., for a particular request), the computing device 102 may analyze the recorded counter data and/or transmit the recorded counter data to the administration device 106 in block 426. As described above, the administration device 106 may analyze the recorded counter data of the computing device 102 in conjunction with the recorded counter data of the other computing devices 102. Further, in some embodiments, the computing device 102 may periodically transmit the recorded counter data to the administration device 106 for analysis. As such, it should be appreciated that, in some embodiments, the computing device 102 may periodically transmit the recorded counter data in response to receiving a request for the counter data from the administration device 106. The method 400 may return to block 412 in which the computing device 102 waits to receive another sampling request from the administration server 106.

As described herein, in some embodiments, the computing device 102 may determine whether to update the global clock at various points in the execution of the method 400 and/or in parallel to the execution of the method 400. That is, in some embodiments, the signals used by each of the computing devices 102 as the global clock may drift from one another and/or the "true" global clocks such that the global clock utilized by the computing device 102 is no longer accurate. It should be appreciated that such clock drift may occur due to hardware, rounding during clock and/or other estimation, and/or various other factors. Accordingly, in some embodiments, the computing device 102 is configured to periodically update the clock signal utilized as the global clock. That is, the computing device 102 may periodically re-determine the global clock and adjust the local clock of the computing device 102 accordingly. It should be appreciated that, in some embodiments, the computing device 102 may receive an updated clock signal from the computing device 102 and/or administration device 106 previously selected to provide the global clock, whereas in other embodiments the computing device 102 may communicate with other computing device 102 again to determine the "best" clock signal.

Figure 5:
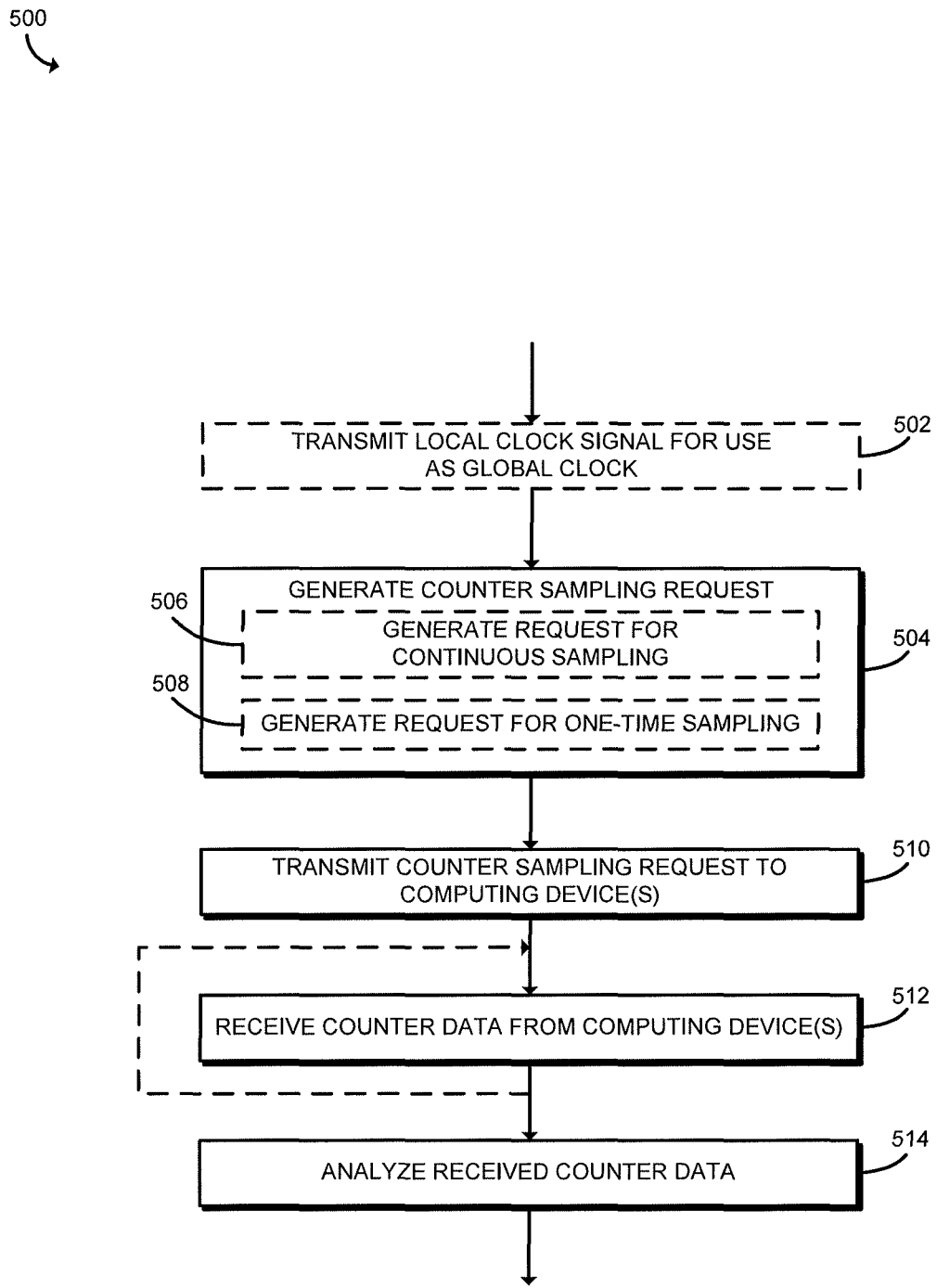
FIG. 5 is a simplified flow diagram of at least one embodiment of a method for analyzing synchronously collected counter data that may be executed by the administration device of FIG. 1.

Referring now to FIG. 5, in use, the administration device 106 may execute a method 500 for analyzing synchronously collected counter data of the computing devices 102. The illustrative method 500 begins with block 502 in which the administration device 106 may transmit a local clock signal to the computing devices 102 to serve as a global clock. Of course, in other embodiments, the computing devices 102 may communicate with one another to determine the appropriate clock to serve as the global clock as described above. In block 504, the administration device 106 may generate a counter sampling request. In doing so, the administration device 106 may generate a request for continuous/periodic sampling in block 506 or a request for a one-time sampling in block 508. As described above, the administration device 106 may determine a starting/ending time at which the computing devices 102 are to record the counters 124.

In block 510, the administration device 106 transmits the counter sampling request to the computing devices 102. As discussed above, in some embodiments, the administration device 106 may transmit the request to each of the computing devices 102 of the system 100; however, in other embodiments, the administration device 106 may transmit the request to only a subset of the computing devices 102. After the computing devices 102 have sampled the counters 124 corresponding with the sampling request, the administration device 106 receives the counter data from the computing devices 102 in block 512. In embodiments in which the computing devices 102 periodically sample the counters 124, it should be appreciated that the administration device 106 may receive the counter data periodically (e.g., over the same period or a different period). Further, depending on the particular embodiment, the counter data received by the administration device 106 may be the "raw" sampled counter data or a derived/analyzed version thereof. For example, in some embodiments, the computing devices 102 may generate two samples and generate counter data associated with the change in the counters 124 over a period of time elapsed between the two samples.

In block 514, the administration device 106 analyzes the counter data received from the computing devices 102. It should be appreciated that the administration device 106 may analyze the counter data based on any suitable technique, algorithm, and/or mechanism. For example, the administration device 106 may be interested in a fine-grained analysis of the bandwidth (e.g., NIC) utilization across a particular network fabric. Further, depending on the particular embodiment, the counter data received from the computing devices 102 may be analyzed "offline" (e.g., after the counters have stopped) or in real-time as the counter data is received from the computing devices 102. In the illustrative embodiment, by synchronizing the sampling of the counters 124 of the computing devices 102 of the system 100 to a single global clock, the administration device 106 may identify even fleeting network congestion events and the effects of those events on other components/devices of the system 100, which may not be readily apparent without synchronous counter data collection.

EXAMPLES

Illustrative examples of the technologies disclosed herein are provided below. An embodiment of the technologies may include any one or more, and any combination of, the examples described below.

Example 1 includes a computing device for synchronized sampling of counters, the computing device comprising a counter to record data associated with performance of the computing device; a clock management module to determine a global clock to which the computing device and a plurality of other computing devices are to be synchronized; and a counter sampling module to (i) receive a request to sample the counter from an administration device and (ii) record a state of the counter based on the global clock in response to receiving the request.

Example 2 includes the subject matter of Example 1, and wherein the clock management module is further to adjust a local clock of the computing device to coincide with the global clock.

Example 3 includes the subject matter of any of Examples 1 and 2, and wherein to adjust the local clock comprises to account for latency associated with receiving a global clock signal that identifies the global clock.

Example 4 includes the subject matter of any of Examples 1-3, and wherein to determine the global clock comprises to receive a global clock signal that identifies the global clock from the administration device.

Example 5 includes the subject matter of any of Examples 1-4, and wherein to determine the global clock comprises to communicate with the other computing devices to select a local clock of one of the other computing devices to serve as the global clock.

Example 6 includes the subject matter of any of Examples 1-5, and further including a communication module to transmit the recorded state of the counter to the administration server.

Example 7 includes the subject matter of any of Examples 1-6, and wherein to receive the request comprises to receive a starting global time at which to record the state of the counter.

Example 8 includes the subject matter of any of Examples 1-7, and wherein to receive the request comprises to receive a length of time after the starting global time at which to record the state of the counter.

Example 9 includes the subject matter of any of Examples 1-8, and wherein to receive the request comprises to receive a request to periodically record the state of the counter.

Example 10 includes the subject matter of any of Examples 1-9, and wherein to record the state of the counter comprises to record the state of that counter at a same point in time at which each of the other computing devices is recording a state of corresponding counters.

Example 11 includes the subject matter of any of Examples 1-10, and further including an analysis module to analyze the recorded state of the counter.

Example 12 includes a method for synchronized sampling of counters by a computing device, the method comprising determining, by the computing device, a global clock to which the computing device and a plurality of other computing devices are to be synchronized; receiving, by the computing device and from an administration device, a request to sample a counter of the computing device; and recording, by the computing device, a state of the counter based on the global clock in response to receiving the request.

Example 13 includes the subject matter of Example 12, and further including adjusting, by the computing device, a local clock of the computing device to coincide with the global clock.

Example 14 includes the subject matter of any of Examples 12 and 13, and wherein adjusting the local clock comprises accounting for latency associated with receiving a global clock signal identifying the global clock.

Example 15 includes the subject matter of any of Examples 12-14, and wherein determining the global clock comprises receiving a global clock signal identifying the global clock from the administration device.

Example 16 includes the subject matter of any of Examples 12-15, and wherein determining the global clock comprises communicating with the other computing devices to select a local clock of one of the other computing devices to serve as the global clock.

Example 17 includes the subject matter of any of Examples 12-16, and further including transmitting, by the computing device, the recorded state of the counter to the administration server.

Example 18 includes the subject matter of any of Examples 12-17, and wherein receiving the request comprises receiving a starting global time at which to record the state of the counter.

Example 19 includes the subject matter of any of Examples 12-18, and wherein receiving the request comprises receiving a length of time after the starting global time at which to record the state of the counter.

Example 20 includes the subject matter of any of Examples 12-19, and wherein receiving the request comprises receiving a request to periodically record the state of the counter.

Example 21 includes the subject matter of any of Examples 12-20, and wherein recording the state of the counter comprises recording the state of that counter at a same point in time at which each other computing device of the plurality of computing devices is recording a state of corresponding counters.

Example 22 includes the subject matter of any of Examples 12-21, and further including analyzing, by the computing device, the recorded state of the counter.

Example 23 includes a computing device comprising a processor; and a memory having stored therein a plurality of instructions that when executed by the processor cause the computing device to perform the method of any of Examples 12-22.

Example 24 includes one or more machine-readable storage media comprising a plurality of instructions stored thereon that, in response to execution by a computing device, cause the computing device to perform the method of any of Examples 12-22.

Example 25 includes a computing device for synchronized sampling of counters, the computing device comprising means for determining a global clock to which the computing device and a plurality of other computing devices are to be synchronized; means for receiving, from an administration device, a request to sample a counter of the computing device; and means for recording a state of the counter based on the global clock in response to receiving the request.

Example 26 includes the subject matter of Example 25, and further including means for adjusting a local clock of the computing device to coincide with the global clock.

Example 27 includes the subject matter of any of Examples 25 and 26, and wherein the means for adjusting the local clock comprises means for accounting for latency associated with receiving a global clock signal identifying the global clock.

Example 28 includes the subject matter of any of Examples 25-27, and wherein the means for determining the global clock comprises means for receiving a global clock signal identifying the global clock from the administration device.

Example 29 includes the subject matter of any of Examples 25-28, and wherein the means for determining the global clock comprises means for communicating with the other computing devices to select a local clock of one of the other computing devices to serve as the global clock.

Example 30 includes the subject matter of any of Examples 25-29, and further including means for transmitting the recorded state of the counter to the administration server.

Example 31 includes the subject matter of any of Examples 25-30, and wherein the means for receiving the request comprises means for receiving a starting global time at which to record the state of the counter.

Example 32 includes the subject matter of any of Examples 25-31, and wherein the means for receiving the request comprises means for receiving a length of time after the starting global time at which to record the state of the counter.

Example 33 includes the subject matter of any of Examples 25-32, and wherein the means for receiving the request comprises means for receiving a request to periodically record the state of the counter.

Example 34 includes the subject matter of any of Examples 25-33, and wherein the means for recording the state of the counter comprises means for recording the state of that counter at a same point in time at which each other computing device of the plurality of computing devices is recording a state of corresponding counters.

Example 35 includes the subject matter of any of Examples 25-34, and further including means for analyzing the recorded state of the counter.

Example 36 includes an administration server for analyzing synchronously collected counter data of a plurality of computing devices, the administration server comprising a counter management module to generate a request for a first computing device of the plurality of computing devices to sample a counter of the first computing device based on a global clock to which each computing device of the plurality of computing devices is synchronized, wherein the counter records data associated with performance of the computing device; and a communication module to (i) transmit the request to the first computing device and (ii) receive, from the first computing device, counter data recorded by the first computing device in response to receipt of the transmitted request.

Example 37 includes the subject matter of Example 36, and wherein to generate the request comprises to determine a starting global time at which the first computing device is to sample the counter.

Example 38 includes the subject matter of any of Examples 36 and 37, and wherein to generate the request comprises to determine a length of time after the starting global time at which the first computing device is to sample the counter.

Example 39 includes the subject matter of any of Examples 36-38, and wherein to generate the request comprises to generate a request for the first computing device to periodically sample the counter.

Example 40 includes the subject matter of any of Examples 36-39, and further including an analysis module to analyze the received counter data in conjunction with corresponding counter data received from other computing devices of the plurality of computing devices.

Example 41 includes the subject matter of any of Examples 36-40, and wherein the communication module is further to transmit a local clock signal of the administration server to the first computing device to serve as the global clock.

Example 42 includes a method for analyzing synchronously collected counter data of a plurality of computing devices, the method comprising generating, by an administration server, a request for a first computing device of the plurality of computing devices to sample a counter of the first computing device based on a global clock to which each computing device of the plurality of computing devices is synchronized, wherein the counter records data associated with performance of the computing device; transmitting, by the administration server, the request to the first computing device; and receiving, by the administration server and from the first computing device, counter data recorded by the first computing device in response to receipt of the transmitted request.

Example 43 includes the subject matter of Example 42, and wherein generating the request comprises determining a starting global time at which the first computing device is to sample the counter.

Example 44 includes the subject matter of any of Examples 42 and 43, and wherein generating the request comprises determining a length of time after the starting global time at which the first computing device is to sample the counter.

Example 45 includes the subject matter of any of Examples 42-44, and wherein generating the request comprises generating a request for the first computing device to periodically sample the counter.

Example 46 includes the subject matter of any of Examples 42-45, and further including analyzing, by the administration device, the received counter data in conjunction with corresponding counter data received from other computing devices of the plurality of computing devices.

Example 47 includes the subject matter of any of Examples 42-46, and further including transmitting, by the administration server and to the first computing device, a local clock signal of the administration server to serve as the global clock.

Example 48 includes a computing device comprising a processor; and a memory having stored therein a plurality of instructions that when executed by the processor cause the computing device to perform the method of any of Examples 42-22.

Example 49 includes one or more machine-readable storage media comprising a plurality of instructions stored thereon that, in response to execution by a computing device, cause the computing device to perform the method of any of Examples 42-22.

Example 50 includes an administration server for analyzing synchronously collected counter data of a plurality of computing devices, the administration server comprising means for generating a request for a first computing device of the plurality of computing devices to sample a counter of the first computing device based on a global clock to which each computing device of the plurality of computing devices is synchronized, wherein the counter records data associated with performance of the computing device; means for transmitting the request to the first computing device; and means for receiving, from the first computing device, counter data recorded by the first computing device in response to receipt of the transmitted request.

Example 51 includes the subject matter of Example 50, and wherein the means for generating the request comprises means for determining a starting global time at which the first computing device is to sample the counter.

Example 52 includes the subject matter of any of Examples 50 and 51, and wherein the means for generating the request comprises means for determining a length of time after the starting global time at which the first computing device is to sample the counter.

Example 53 includes the subject matter of any of Examples 50-52, and wherein the means for generating the request comprises means for generating a request for the first computing device to periodically sample the counter.

Example 54 includes the subject matter of any of Examples 50-53, and further including means for analyzing the received counter data in conjunction with corresponding counter data received from other computing devices of the plurality of computing devices.

Example 55 includes the subject matter of any of Examples 50-54, and further including means for transmitting, to the first computing device, a local clock signal of the administration server to serve as the global clock.

What is claimed is:

1. A computing device for synchronized sampling of counters, the computing device comprising:
   a counter to record data associated with performance of a processor of the computing device, wherein the processor is associated with a local clock to provide an input clock signal to the processor;
   a clock management module to adjust the local clock associated with the processor for which the counter is to record data associated with performance of the processor to coincide with a global clock to which the computing device and a plurality of other computing devices are to be synchronized; and
   a counter sampling module to (i) receive a request to sample the counter from an administration device, wherein the request includes a particular starting global time at which sampling should begin; (ii) record a state of the counter based on the global clock in response to receiving the request; and (iii) one or more of (a) analyze the state of the counter or (b) transmit the state of the counter to the administration device.

2. The computing device of claim 1, wherein to adjust the local clock comprises to account for latency associated with receiving a global clock signal that identifies the global clock.

3. The computing device of claim 1, wherein to determine the global clock comprises to receive a global clock signal that identifies the global clock from the administration device.

4. The computing device of claim 1, wherein to determine the global clock comprises to communicate with the other computing devices to select a local clock of one of the other computing devices to serve as the global clock.

5. The computing device of claim 1, further comprising a communication module to transmit the recorded state of the counter to the administration device.

6. The computing device of claim 1, wherein to receive the request comprises to receive a starting global time at which to record the state of the counter.

7. The computing device of claim 6, wherein to receive the request comprises to receive a length of time after the starting global time at which to record the state of the counter.

8. The computing device of claim 1, wherein to receive the request comprises to receive a request to periodically record the state of the counter.

9. The computing device of claim 1, wherein to record the state of the counter comprises to record the state of that counter at a same point in time at which each of the other computing devices is recording a state of corresponding counters.

10. The computing device of claim 1, wherein the counter forms a portion of the processor.

11. One or more non-transitory, machine-readable storage media comprising a plurality of instructions stored thereon that, in response to execution by a computing device, cause the computing device to:
    adjust a local clock that provides an input clock signal to a processor of the computing device for which performance is to be recorded by a counter to coincide with a global clock to which the processor of the computing device and a plurality of other computing devices are to be synchronized;
    receive, from an administration device, a request to sample the counter of the computing device, wherein the request includes a particular starting global time at which sampling should begin;
    record a state of the counter based on the global clock in response to receipt of the request; and
    one of more of: (i) analyze the state of the counter or (ii) transmit the state of the counter to the administration device.

12. The one or more non-transitory, machine-readable storage media of claim 11, wherein to adjust the local clock comprises to account for latency associated with receipt of a global clock signal that identifies the global clock.

13. The one or more non-transitory, machine-readable storage media of claim 11, wherein to determine the global clock comprises to receive a global clock signal that identifies the global clock from the administration device.

14. The one or more non-transitory, machine-readable storage media of claim 11, wherein to determine the global clock comprises to communicate with the other computing devices to select a local clock of one of the other computing devices to serve as the global clock.

15. The one or more non-transitory, machine-readable storage media of claim 11, wherein the plurality of instructions further cause the computing device to transmit the recorded state of the counter to the administration server.

16. The one or more non-transitory, machine-readable storage media of claim 11, wherein to receive the request comprises to receive (i) a starting global time at which to record the state of the counter and (ii) a length of time after the starting global time at which to record the state of the counter.

17. The one or more non-transitory, machine-readable storage media of claim 11, wherein to receive the request comprises to receive a request to periodically record the state of the counter.

18. The one or more non-transitory, machine-readable storage media of claim 11, wherein to record the state of the counter comprises to record the state of the counter at a same point in time at which each other computing device of the plurality of computing devices is to record a state of corresponding counters.

19. An administration server for analyzing synchronously collected counter data of a plurality of computing devices, the administration server comprising:
    a counter management module to generate a request for a first computing device of the plurality of computing devices to sample a counter of the first computing device based on a global clock to which each computing device of the plurality of computing devices is synchronized, wherein the counter records data associated with performance of the computing device, wherein the request includes a particular starting global time at which sampling should begin; and
    a communication module to (i) transmit the request to the first computing device, (ii) transmit a local clock signal of the administration server to the first computing device to serve as the global clock to cause the first computing device to adjust a local clock associated with a processor of the first computing device responsive to receipt of the local clock signal from the administration server, (iii) receive, from the first computing device, counter data recorded by the first computing device in response to receipt of the transmitted request, wherein the local clock associated with the processor is to provide an input clock signal to the processor of the first computing device; and (iv) analyze the counter data recorded by the first computing device.

20. The administration server of claim 19, wherein to generate the request comprises to determine a starting global time at which the first computing device is to sample the counter.

21. The administration server of claim 20, wherein to generate the request comprises to determine a length of time after the starting global time at which the first computing device is to sample the counter.

22. The administration server of claim 19, wherein to generate the request comprises to generate a request for the first computing device to periodically sample the counter.

23. The administration server of claim 19, further comprising an analysis module to analyze the received counter data in conjunction with corresponding counter data received from other computing devices of the plurality of computing devices.

* * * * *